United States Patent
Chen et al.

(10) Patent No.: US 11,630,667 B2
(45) Date of Patent: Apr. 18, 2023

(54) DEDICATED VECTOR SUB-PROCESSOR SYSTEM

(71) Applicant: ADVANCED MICRO DEVICES, INC., Santa Clara, CA (US)

(72) Inventors: Jiasheng Chen, Orlando, FL (US); Bin He, Orlando, FL (US); Jian Huang, Orlando, FL (US); Michael Mantor, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/697,660

(22) Filed: Nov. 27, 2019

(65) Prior Publication Data
US 2021/0157588 A1  May 27, 2021

(51) Int. Cl.
*G06F 9/30* (2018.01)
*G06F 9/48* (2006.01)

(52) U.S. Cl.
CPC ........ *G06F 9/30036* (2013.01); *G06F 9/3001* (2013.01); *G06F 9/30098* (2013.01); *G06F 9/4887* (2013.01)

(58) Field of Classification Search
CPC .................................................. G06F 9/30036
See application file for complete search history.

(56) References Cited

U.S. PATENT DOCUMENTS

| | | | |
|---|---|---|---|
| 7,133,951 B1* | 11/2006 | Bourekas | G06F 9/3012 710/260 |
| 8,468,191 B2 | 6/2013 | Mantor et al. | |
| 2009/0254718 A1* | 10/2009 | Biscondi | G06F 9/30018 711/154 |
| 2017/0344369 A1* | 11/2017 | Cho | G06F 9/30036 |
| 2018/0113709 A1 | 4/2018 | He et al. | |
| 2018/0121386 A1* | 5/2018 | Chen | G06F 9/3851 |
| 2018/0285106 A1* | 10/2018 | Appu | G06F 9/3851 |
| 2018/0357064 A1* | 12/2018 | Chen | G06F 9/3867 |
| 2019/0171448 A1 | 6/2019 | Chen et al. | |

OTHER PUBLICATIONS

U.S. Appl. No. 16/581,252, filed Sep. 24, 2019, listing Bin He et al. as inventor(s), entitled "A Matrix Multiplication Unit With Flexible Precision Operations", 27 pages.
U.S. Appl. No. 16/287,013, filed Feb. 27, 2019, listing Jiasheng Chen et al. as inventor(s), entitled "Hybrid Matrix Multiplication Pipeline", 37 pages.
"AMD Unveils World's First 7nm Datacenter GPUs—Powering the Next Era of Artificial Intelligence, Cloud Computing and High Performance Computing (HPC)", AMD Press Release dated Nov. 6, 2018, 4 pages.

* cited by examiner

Primary Examiner — Michael J Metzger (57) ABSTRACT

A processor includes a plurality of vector sub-processors (VSPs) and a plurality of memory banks dedicated to respective VSPs. A first memory bank corresponding to a first VSP includes a first plurality of high vector general purpose register (VGPR) banks and a first plurality of low VGPR banks corresponding to the first plurality of high VGPR banks. The first memory bank further includes a plurality of operand gathering components that store operands from respective high VGPR banks and low VGPR banks. The operand gathering components are assigned to individual threads while the threads are executed by the first VSP.

18 Claims, 5 Drawing Sheets

DEDICATED VECTOR SUB-PROCESSOR SYSTEM

BACKGROUND

Data-intensive applications such as deep learning, high performance computing (HPC), cloud computing, and graphics rendering are used to address challenges including large-scale simulation, climate change, computational biology, disease prevention, financial modeling, and the like. Processors, such as graphics processing units (GPUs), are designed to provide high floating-point performance and high memory bandwidth to support the data-intensive applications. For example, each single-instruction-multiple-data (SIMD) element in the GPU includes several vector sub-processors (VSPs) to perform concurrent operations such as matrix multiplications. In some cases, the GPUs support deep learning operations (dlops) that provide flexible mixed-precision capabilities to support dynamic workloads such as training neural networks and running inference against the trained neural networks. In some cases, implementing the flexible mixed-precision capabilities involves incorporating complex multiplexers, a broadcast switch between the VSPs in the GPU, and a relatively complex layout of registers, such as vector general-purpose registers (VGPRs), to support the VSPs.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

As described herein, in various embodiments, a processor includes a plurality of vector sub-processors (VSPs) that pass data to each other via a broadcast switch. The processor further includes memory banks including high vector general purpose register (VGPR) banks, low VGPR banks, and operand gathering components, all of which are dedicated to respective VSPs. Threads are assigned to individual VSPs and their respective memory banks. In some cases, double-precision computing is performed by sending thread data from the memory banks to the respective VSPs, as opposed to sending the data via a central switching fabric in systems where thread data is processed by multiple VSPs. As a result, a bandwidth strain on the central switching fabric is reduced. Further, synchronization of data received from multiple VGPR banks (e.g., a high VGPR bank and a low VGPR bank) is simplified, as compared to systems where the data is passed from memory banks to VSPs via the central switching fabric.

In various embodiments, processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like) implement multiple processing elements (which are also referred to as processor cores or compute units) such as VSPs that concurrently execute sets of instructions or operations on multiple data sets. The sets of instructions or operations are referred to as threads. Operation indications, program data, or both for the threads is stored in memory banks (e.g., VGPR banks) and then sent to the processing elements for processing. In some cases where a single data set is used in multiple VSPs, such as matrix multiplication operations, the data set is broadcast to the VSPs via a broadcast switch.

Some processors process threads by storing thread data at VGPR banks that are accessible by multiple VSPs via a complex switching fabric. However, in some situations, such as when the threads call for double-precision computation, which uses larger data operands than single precision computation, the switching fabric has high congestion as thread data is passed through the switching fabric. Further, in some cases, when portions of the thread data are stored in different VGPR banks, passing the data through the switching fabric causes synchronization problems because the thread data is used concurrently in some computations. In contrast, using the techniques described herein, VGPR banks are dedicated to corresponding VSPs, thereby simplifying provision of thread data to the VSPs and improving processing efficiency.

As described herein, the term "dedicated" is intended to be interpreted as describing a system where a first device of a first type exclusively sends data to a second device of a second type and not to other devices of the second type. For example, a memory that is "dedicated" to a processor would send data to that processor (either directly or via one or more intervening devices) and not to another processor. In some cases, a first device that is dedicated to a second device is part of the second device. As used herein, a VGPR is "dedicated" to a given VSP of a set of VSPs when the VGPR exclusively sends data to the given VSP and not to other VSPs in the set of VSPs. Similarly, an operand gathering component is "dedicated" to a given VSP of a set of VSPs when the operand gathering component exclusively sends data to the given VSP and not to other VSPs in the set of VSPs.

Figure 1:
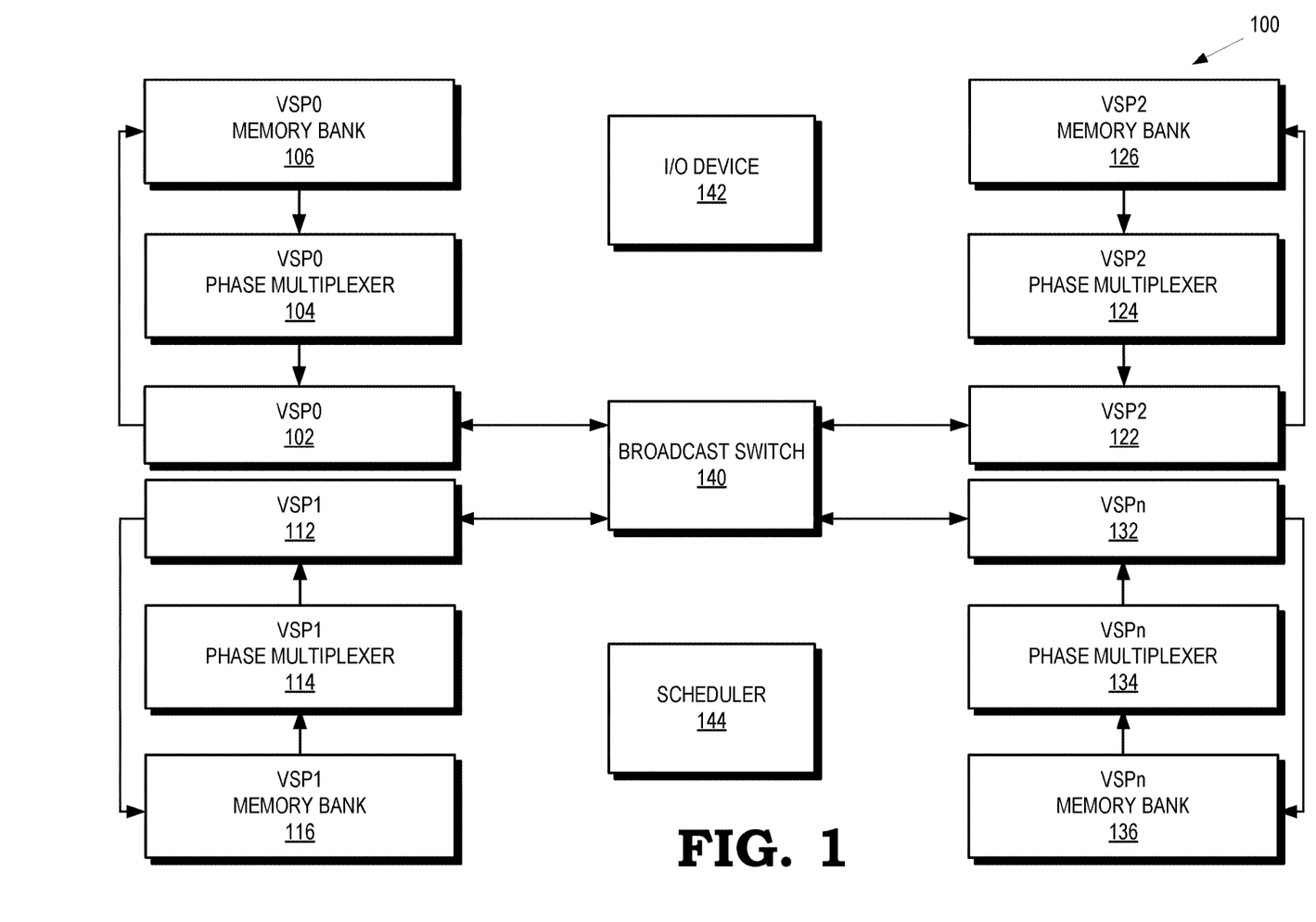
FIG. 1 is a block diagram of a single instruction, multiple data unit including a plurality of dedicated vector sub-processor systems in accordance with some embodiments.

FIG. 1 illustrates a single instruction, multiple data (SIMD) unit 100 of a processor in accordance with some embodiments. In the illustrated embodiment, SIMD unit 100 includes a plurality of dedicated vector sub-processor (VSP) systems, broadcast switch 140, input/output (I/O) device 142, and scheduler 144. Each dedicated VSP system includes a VSP (VSP0 102, VSP1 112, VSP2 122, and VSPn 132), a phase multiplexer (VSP0 phase multiplexer 104, VSP1 phase multiplexer 114, VSP2 phase multiplexer 124, and VSPn phase multiplexer 134), and a memory bank (VSP0 memory bank 106, VSP1 memory bank 116, VSP2 memory bank 126, and VSPn memory bank 136). Although the illustrated embodiment includes four dedicated VSP systems, in other embodiments, additional or fewer dedicated VSP systems are contemplated. Similarly, in other embodiments, other structural arrangements (e.g., additional components or fewer components) are contemplated.

In some embodiments, as further discussed below with reference to FIG. 5, SIMD unit 100 is part of a device such as a desktop or laptop computer, server, smartphone, tablet, game console, or other electronic device. The device includes a central processing unit (CPU) that sends various commands or instructions (e.g., threads) to a processor including SIMD unit 100 (e.g., via I/O device 142).

In the illustrated embodiment, SIMD unit 100 executes operations as part of various threads. These operations call for thread data (e.g., operands) to be processed. In some embodiments, indications of these operations are received via I/O device 142. In other embodiments, indications of these operations are retrieved from a memory device.

Scheduler 144 assigns threads to dedicated VSP systems by identifying one or more memory components of a memory bank of a dedicated VSP system and by sending the thread data to the one or more identified memory components. In some embodiments, scheduler 144 identifies the one or more memory components based on an address or other identifier of the thread. For example, in some cases, scheduler 144 identifies a high vector general purpose register (VGPR) bank and a low VGPR bank of VSP1 memory bank 116 based on a thread address of a thread that indicates double-precision calculations. In the example, scheduler 144 sends a portion of the thread data to the high VGPR bank and a different portion of the thread data to the low VGPR bank. In some embodiments, threads are dedicated to dedicated VSP systems on a one-to-one basis.

As further discussed below with reference to FIGS. 2 and 3, in the illustrated embodiment, VSP memory banks 106, 116, 126, and 136 store thread data for corresponding VSPs 102, 112, 122, and 132. In some cases, the VSP memory banks provide operands from the thread data to corresponding VSP phase multiplexers 104, 114, 124, and 134. In some embodiments, the operands are provided by multiple memory components (e.g., a high VGPR bank and a low VGPR bank) of a memory bank.

VSP phase multiplexers 104, 114, 124, and 134 are multiplexers that receive operands from corresponding VSP memory banks 106, 116, 126, and 136 and selectively send the operands to corresponding VSPs 102, 112, 122, and 132. In various embodiments, VSP phase multiplexers 104, 114, 124, and 134 receive the operands for multiple cycles and sends different groups of operands to respective VSPs 102, 112, 122, and 132 during different cycles of the multiple cycles.

VSPs 102, 112, 122, and 132 perform various operations on operands received from corresponding VSP phase multiplexers 104, 114, 124, and 134. In some cases, some operations (e.g., matrix multiplication operations) also use operands received at one or more of VSPs 102, 112, 122, and 132 (e.g., from VSP2 122 to VSPs 102, 112, and 132) via broadcast switch 140. As further discussed below with reference to FIGS. 2 and 3, in some embodiments, the operands are sent to an arithmetic logic unit (ALU) of the VSP and the ALU performs arithmetic operations using the operands. In some cases, as part of performing the operations, VSPs 102, 112, 122, and 132 generate resulting data. In some cases, the resulting data is sent to one or more memory components of corresponding VSP memory banks 106, 116, 126, and 136. Additionally or alternatively, in some cases, the same or different resulting data is output by the VSP to I/O device 142, where the data is eventually sent to another device (e.g., a CPU or to another dedicated VSP system).

In the illustrated embodiment, VSP memory banks 106, 116, 126, and 136 and VSP phase multiplexers 104, 114, 124, and 134 are dedicated to respective VSPs 102, 112, 122, and 132. Accordingly, VSPs 102, 112, 122, and 132 perform thread operations without accessing memory banks via broadcast switch 140 or a switching fabric. As a result, an amount of traffic passed through the switching fabric is reduced. In some cases, such as when VSPs 102, 112, 122, and 132 are performing double-precision computations, thread data is output more quickly, as compared to a system where VSPs are connected to memory banks via a switching fabric.

Figure 2:
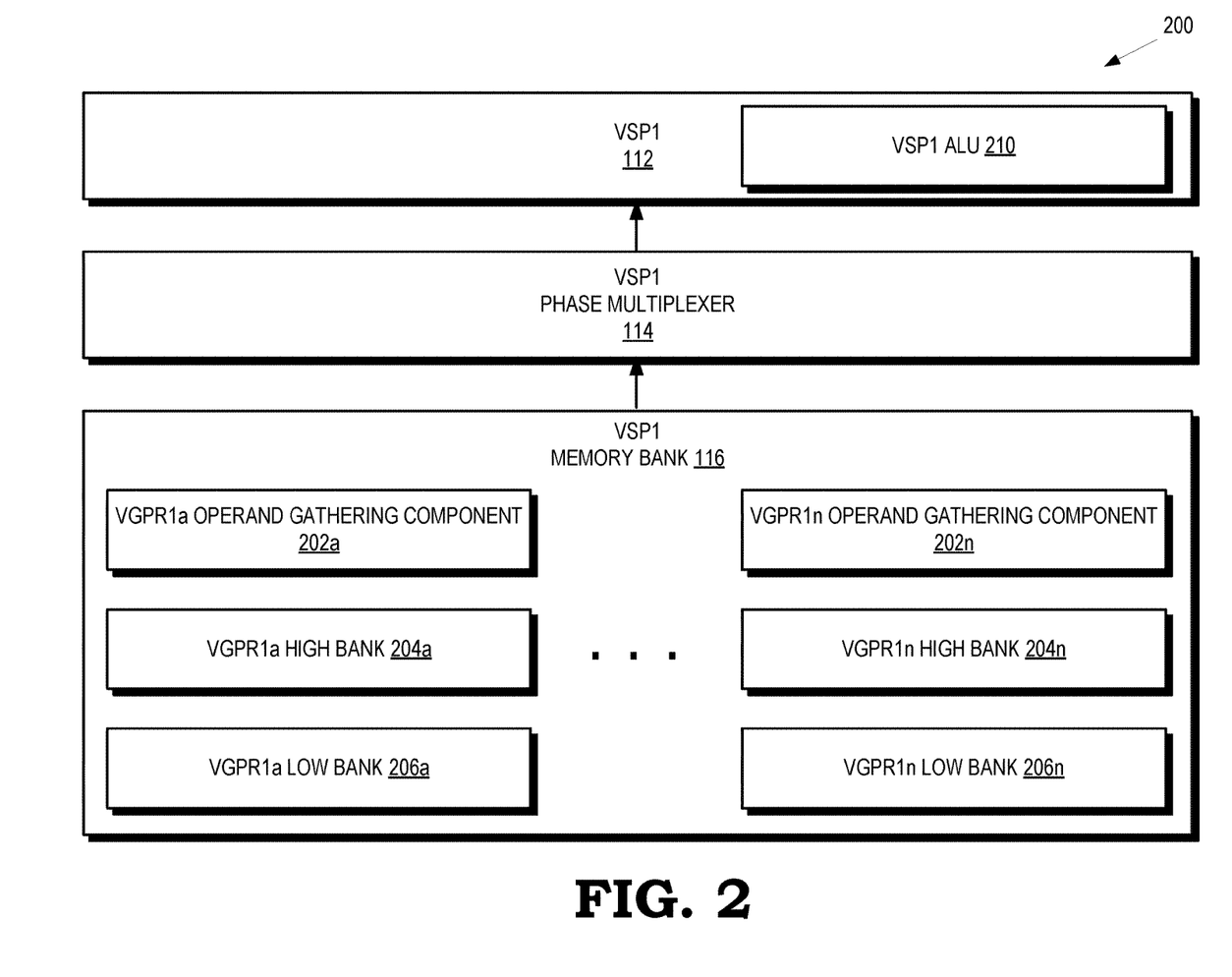
FIG. 2 is a block diagram of a dedicated vector sub-processor system in accordance with some embodiments.

FIG. 2 is a block diagram illustrating a dedicated vector sub-processor (VSP) system 200 in accordance with some embodiments. In the illustrated embodiment, dedicated VSP system 200 includes VSP1 112, VSP1 phase multiplexer 114, and VSP1 memory bank 116 of FIG. 1. VSP1 112 includes VSP1 arithmetic logic unit (ALU) 210. VSP1 memory bank 116 includes vector general purpose register (VGPR)1$a$-$n$ operand gathering components 202$a$-$n$, VGPR1$a$-$n$ high banks 204$a$-$n$, and VGPR1$a$-$n$ low banks 206$a$-$n$. Although the illustrated embodiment includes specific numbers of components (e.g., one ALU), in other embodiments, other structural arrangements (e.g., additional components or fewer components) are contemplated.

As described above, thread data is sent to VSP1 memory bank 116 (e.g., by a scheduler, VSP1 112, another device, or a combination thereof). In the illustrated embodiment, high banks, low banks, and operand gathering components of VSP1 memory bank 116 are assigned to individual threads (e.g., on a one-to-one basis) while the thread is assigned to VSP1 112 (e.g., while the thread data is stored at VSP1 memory bank 116). For example, in some cases, a portion of incoming thread data (e.g., 64 least significant bits of a 128-bit input) is stored at VGPR1$a$ low bank 206$a$, and a different portion of the incoming thread data (e.g., 64 most significant bits of the 128-bit input) is stored at VGPR1$a$ high bank 204$a$. Subsequently, operands of the thread data are sent to VGPR1$a$ operand gathering component 202$a$ (e.g., concurrently or sequentially). In some embodiments, VGPR1$a$ operand gathering component 202$a$ includes a plurality of flip-flops, latches, or other storage devices. VGPR1$a$ operand gathering component 202$a$ stores the operands and sends the operands to VSP1 phase multiplexer 114. As a result, in some cases, the operands are output to VSP1 phase multiplexer 114 in multiple cycles without being fetched from VGPR1$a$ high bank 204$a$ and VGPR1$a$ low bank 206$a$ multiple times. Further, in some cases, VGPR1$a$ operand gathering component 202$a$ synchronizes the received thread data. Synchronizing the received thread data using a VGPR operand gathering component avoids, in some cases, synchronization problems caused by sending operands through a broadcast switch (e.g., in systems where memory banks are separated from VSPs by a broadcast switch).

VSP1 phase multiplexer 114 receives operands from VGPR1$a$-$n$ operand gathering components 202$a$-$n$ and selectively sends the operands to VSP1 (e.g., to VSP1 ALU 210). In various embodiments, VSP1 phase multiplexer 114 receives the operands for multiple cycles and sends different groups of operands to VSP1 during different cycles of the multiple cycles.

VSP1 112 performs operations using thread data (e.g., operands). In some cases, the operations are arithmetic operations performed using VSP1 ALU 210. As part of performing the operations, in some cases, VSP1 112 generates resulting data (e.g., arithmetic results of the arithmetic operations). As discussed above, in some cases, VSP1 sends the resulting data to I/O device 142, VSP1 memory bank 116, or another device.

Figure 3:
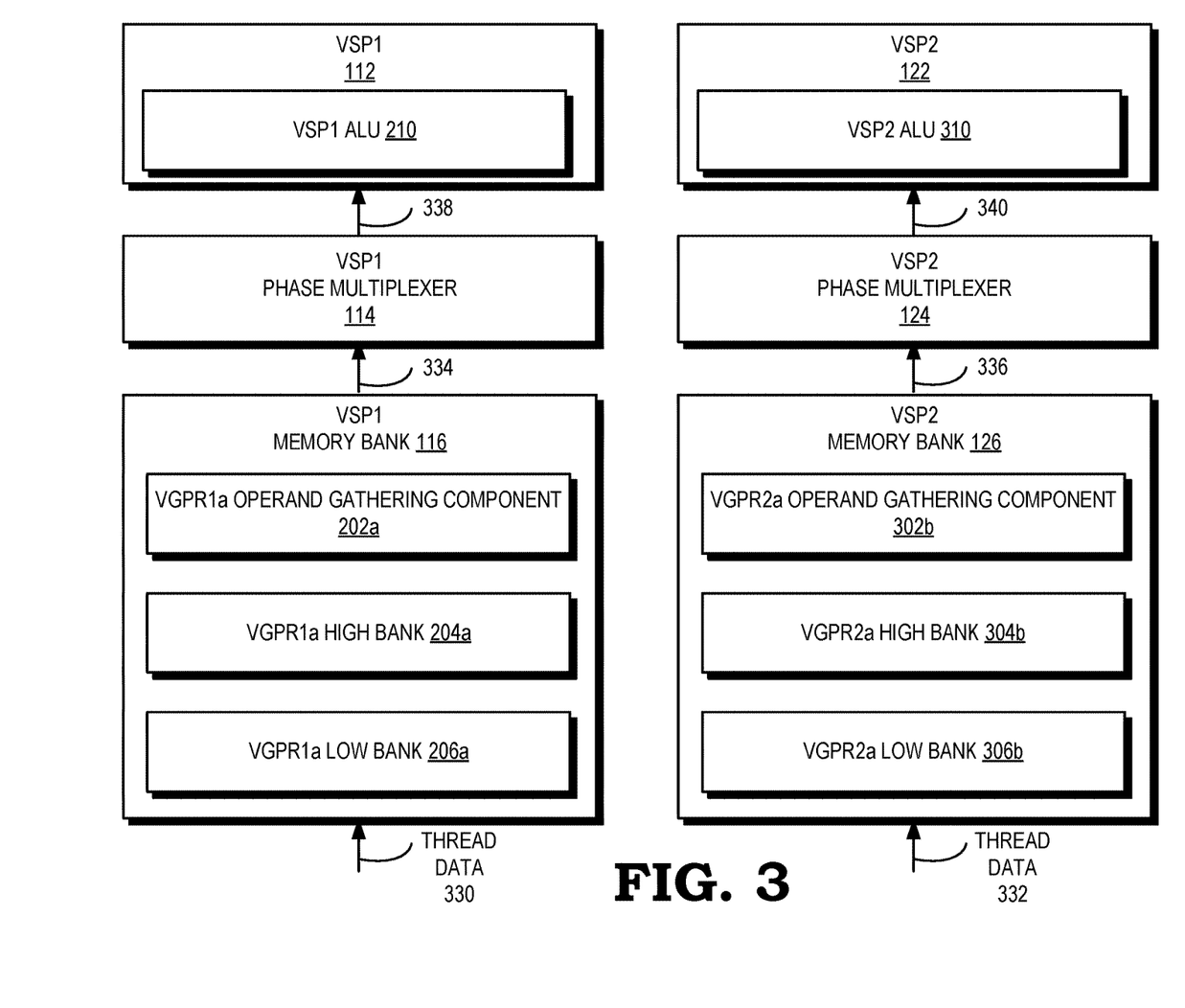
FIG. 3 is a block diagram illustrating two example dedicated vector sub-processor systems processing thread data in accordance with some embodiments.

FIG. 3 is a block diagram depicting two example dedicated vector sub-processor systems processing thread data in accordance with some embodiments. VGPR1a operand gathering component 202a, VGPR1a high bank 204a, and VGPR1a low bank 206a are dedicated to VSP1 112. VGPR2a operand gathering component 302a, VGPR2a high bank 304a, and VGPR2a low bank 306a are dedicated to VSP2 122.

In the illustrated example, thread data 330 (e.g., operands) has 16 bits and is assigned to VSP1 112 (e.g., based on an address of the thread associated with thread data 330) and thread data 332 is assigned to VSP2 122. Further, VGPR1a operand gathering component 202a, VGPR1a high bank 204a, and VGPR1a low bank 206a are assigned to the thread corresponding thread data 330. Similarly, VGPR2a operand gathering component 302a, VGPR2a high bank 304a, and VGPR2a low bank 306a are assigned to the thread corresponding thread data 332. The 8 most significant bits of thread data 330 are stored at VGPR1a high bank 204a and the 8 least significant bits of thread data 330 are stored at VGPR1a low bank 206a. Similarly, the 8 most significant bits of thread data 332 are stored at VGPR2a high bank 304a and the 8 least significant bits of thread data 332 are stored at VGPR2a low bank 306a. Further, in the example, in response to 8 bits of thread data being assigned to VSP1 112, the 8 bits of thread data are stored at one of VGPR1a high bank 204a or VGPR1b low bank 206a.

Subsequent to storing thread data 330, thread data 330 is requested (e.g., by VSP1 112 or by VSP1 phase multiplexer 114). VGPR1a operand gathering component 202a receives and stores the portion of thread data 330 stored at VGPR1a high bank 204a and at VGPR1a low bank 206a. VGPR1a operand gathering component 202a sends the thread data to VSP1 phase multiplexer 114 as thread data 334. Similarly, VGPR2a operand gathering component 302a gathers and sends thread data 336 to VSP2 phase multiplexer 124. In the illustrated example, VSP1 phase multiplexer 114 selectively passes the thread data 334 as operands 338 to VSP1 112 (e.g., to VSP1 ALU 210) for computation. Similarly, VSP2 phase multiplexer 124 passes thread data 336 to VSP2 122 as operands 340. In some cases, thread data is received at VSP phase multiplexers 114 and 124 from multiple VGPR operand gathering components.

VSP1 112 receives operands 338 and performs indicated operations (e.g., computations using VSP1 ALU 210). In the illustrated example, VSP1 112 subsequently outputs resulting data using an I/O device, such as I/O device 142 of FIG. 1. Similarly, VSP2 122 performs indicated operations using operands 340 and outputs the resulting data. Accordingly, thread data from multiple threads is stored, processed, and output.

Figure 4:
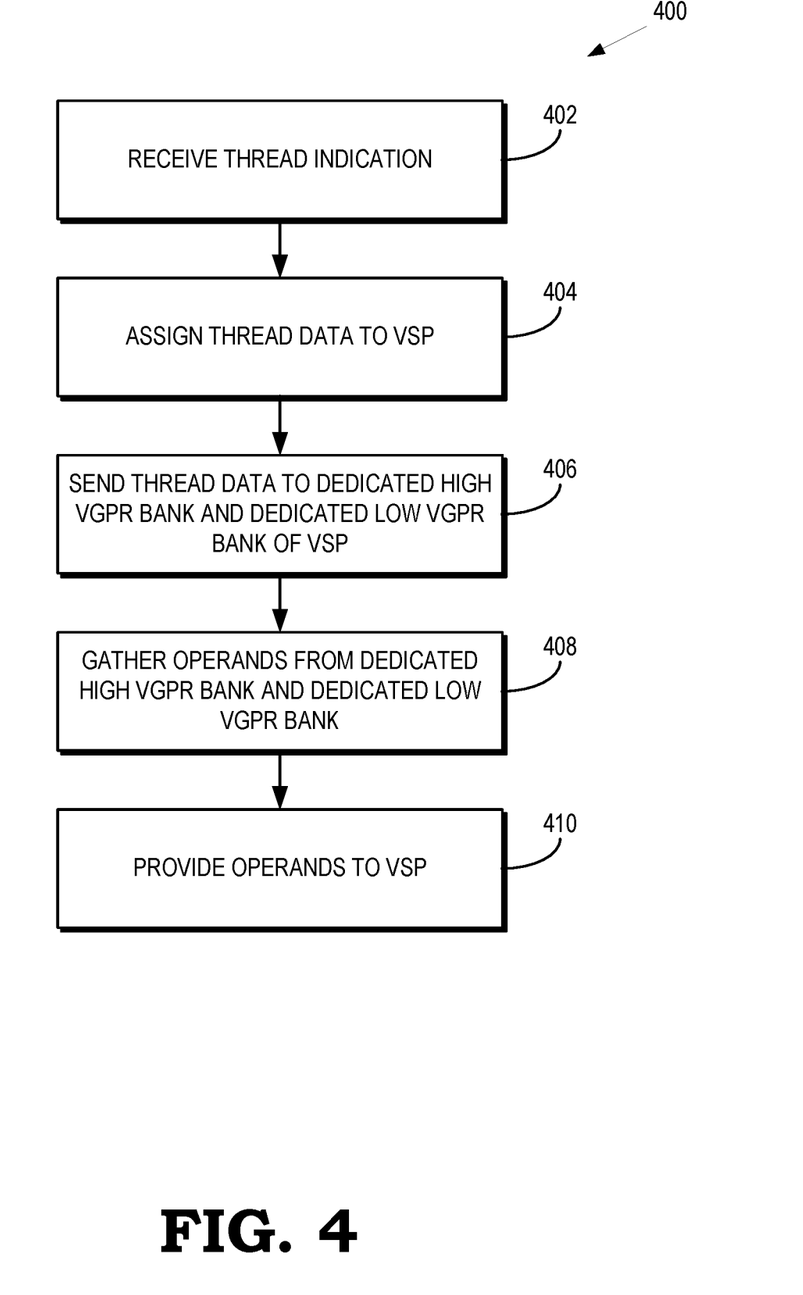
FIG. 4 is a flow diagram illustrating a method of providing thread data to a vector sub-processor in accordance with some embodiments.

FIG. 4 is a flow diagram illustrating a method 400 of providing thread data to a vector sub-processor in accordance with some embodiments. Method 400 is implemented, in some embodiments, by a scheduler such as scheduler 144 of FIG. 1 and various components of a dedicated VSP system such as dedicated VSP system 200 of FIG. 2. In some embodiments, method 400 is initiated by one or more processors in response to one or more instructions stored by a computer-readable storage medium.

At 402, method 400 includes receiving a thread indication. For example, in some cases, scheduler 144 receives an indication from a CPU that includes or indicates an address of a thread.

At 404, method 400 includes assigning thread data corresponding to the thread indication to a VSP. For example, in some cases, scheduler 144 assigns the thread to VSP1 112 based on the address of the thread.

At 406, method 400 includes sending thread data to a dedicated high VGPR bank and a dedicated low VGPR bank of the VSP. For example, in some cases, scheduler 144 sends a portion of the thread data to VGPR1a high bank 204a and another portion of the thread data to VGPR1a low bank 206a.

At 408, method 400 includes gathering operands from the dedicated high VGPR bank and the dedicated low VGPR bank. For example, in some cases, VGPR1a operand gathering component 202a gathers operands (e.g., thread data) from VGPR1a high bank 204a and VGPR1a low bank 206a.

At 410, method 400 includes providing the operands to the VSP. For example, in some cases, VGPR1a operand gathering component 202a sends the gathered operands to VSP 112 via VSP1 phase multiplexer 114. Accordingly, a method of providing data to a VSP is depicted.

Figure 5:
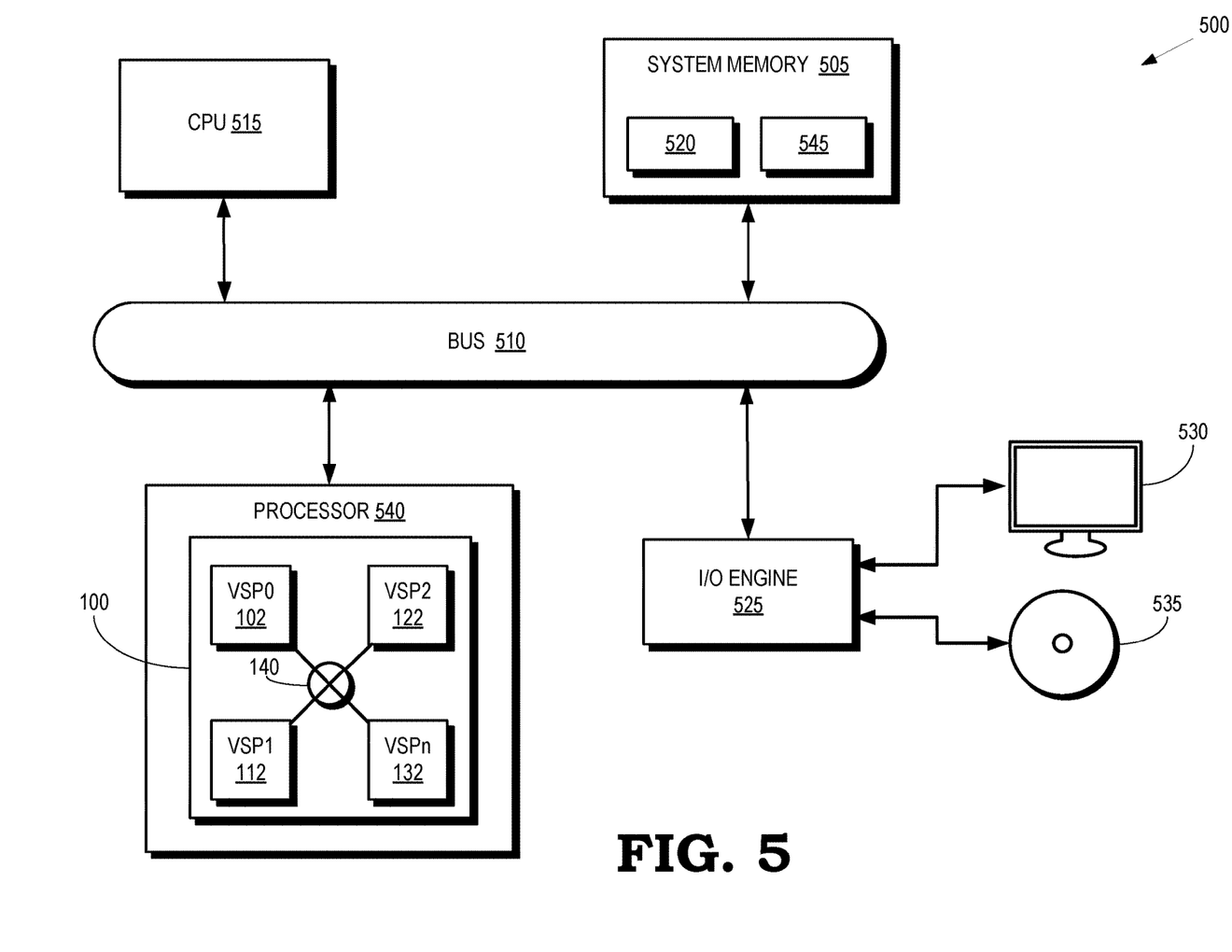
FIG. 5 is a block diagram of a processing system that includes a dedicated vector sub-processing system according to some embodiments.

FIG. 5 is a block diagram depicting of a processing system 500 that includes a dedicated vector sub-processing system according to some embodiments. Processing system 500 includes or has access to a system memory 505 or other storage component that is implemented using a non-transitory computer readable medium such as a dynamic random access memory (DRAM). However, some embodiments of the system memory 505 are implemented using other types of memory including static random access memory (SRAM), nonvolatile RAM, and the like. Processing system 500 also includes a bus 510 to support communication between entities implemented in the processing system 500, such as the system memory 505. Some embodiments of the processing system 500 include other buses, bridges, switches, routers, and the like, which are not shown in FIG. 5 in the interest of clarity.

Processing system 500 includes a central processing unit (CPU) 515. Some embodiments of the CPU 515 include multiple processing elements (not shown in FIG. 5 in the interest of clarity) that execute instructions concurrently or in parallel. The processing elements are referred to as processor cores, compute units, or using other terms. The CPU 515 is connected to the bus 510 therefore communicates with the system memory 505 via the bus 510. The CPU 515 executes instructions such as program code 520 stored in the system memory 505 and the CPU 515 stores information in the system memory 505 such as the results of the executed instructions. The CPU 515 is also able to initiate processing (e.g., graphics processing or other data-intensive applications) at processor 540 by issuing instructions to processor 540 (e.g., draw calls).

An input/output (I/O) engine 525 handles input or output operations associated with a display 530, as well as other elements of the processing system 500 such as keyboards, mice, printers, external disks, and the like. The I/O engine 525 is coupled to the bus 510 so that the I/O engine 525 is able to communicate with the system memory 505, the CPU 115, or other entities that are connected to the bus 510. In the illustrated embodiment, the I/O engine 525 reads information stored on an external storage component 535, which is implemented using a non-transitory computer readable medium such as a compact disk (CD), a digital video disc (DVD), and the like. The I/O engine 525 also writes information to the external storage component 535, such as the results of processing by the CPU 515.

The processing system 500 includes processor 540 that performs various data-intensive applications and further renders images for presentation on the display 530. For example, the processor 540 renders objects to produce values of pixels that are provided to the display 530, which uses the pixel values to display an image that represents the rendered objects. Some embodiments of the processor 540 are used for general purpose computing. In the illustrated embodiment, the processor 540 communicates with the system memory 505 (and other entities that are connected to the bus 510) over the bus 510. However, some embodiments of the processor 540 communicate with the system memory 505 over a direct connection or via other buses, bridges, switches, routers, and the like. The processor 540 executes instructions stored in the system memory 505 and the processor 540 stores information in the system memory 505 such as the results of the executed instructions. For example, the system memory 505 stores a copy 545 of instructions that represent a program code that is to be executed by the processor 540.

The processor 540 includes one or more single-instruction-multiple-data (SIMD) units 100, although only one is shown in FIG. 5 in the interest of clarity. The SIMD unit 100 includes multiple processing elements such as vector subprocessors (VSPs) 102, 112, 122, 132, which are collectively referred to herein as "the VSPs 102-132." In the illustrated embodiment, the VSPs 102-132 are interconnected by a broadcast switch 140 that provides communication pathways for conveying information between the VSPs 102-132. VSPs 102-132 are further connected (e.g., directly or indirectly) to an I/O device 142 (not shown in the interest of clarity) that provides communication pathways for conveying information out of SIMD unit 100 (e.g., to CPU 515). The VSPs 102-132 perform operations (e.g., vector operations) on information fetched from the system memory 505 (e.g., into registers such as vector general-purpose registers (VGPRs) as described above, which are not shown in FIG. 5 in the interest of clarity).

Some embodiments of the processor 540 are implemented as a 32-bit streaming processor that flexibly operates at different precisions. For example, the processor 540 performs regular math and matrix math operations using single precision operands, double-precision operands, FP16 operands, and 8-bit integer operands. Further, as discussed above, because various hardware is dedicated to the VSPs 102-132 (e.g., VGPRs), in some cases, double-precision operations are performed with less congestion in broadcast switch 140, as compared to a system where the hardware is not dedicated to the VSPs 102-132.

In some embodiments, the apparatus and techniques described above are implemented in a system including one or more integrated circuit (IC) devices (also referred to as integrated circuit packages or microchips), such as the processor and associated components described above with reference to FIGS. 1-5. In some cases, electronic design automation (EDA) and computer aided design (CAD) software tools are used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code includes instructions, data, or a combination of instructions and data. The software instructions representing a design tool or fabrication tool typically are stored in a computer readable storage medium accessible to the computing system. Likewise, the code representative of one or more phases of the design or fabrication of an IC device are stored in and accessed from the same computer readable storage medium or a different computer readable storage medium.

In some embodiments, a computer readable storage medium includes any non-transitory storage medium, or combination of non-transitory storage media, accessible by a computer system during use to provide instructions and/or data to the computer system. In various embodiments, such storage media includes, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. In some embodiments, the computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. In some embodiments, the software includes the instructions and certain data that, when executed by the one or more processors, manipulate the one or more processors to perform one or more aspects of the techniques described above. For example, in some cases, the non-transitory computer readable storage medium includes a magnetic or optical disk storage device, solid state storage devices such as Flash memory, a cache, random access memory (RAM) or other non-volatile memory device or devices, and the like. In some embodiments, the executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device are not required, and that one or more further activities are performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that cause any benefit, advantage, or solution to occur or become more pronounced are not to be construed as a critical, required, or essential feature of any or all the claims. Moreover, the particular embodiments disclosed above are illustrative only, as the disclosed subject matter could be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above could be altered or modified and all such variations are considered within the scope of the disclosed subject matter. Accordingly, the protection sought herein is as set forth in the claims below.

What is claimed is:

1. A processor, comprising:
   a plurality of vector sub-processors (VSPs);
   a broadcast switch configured to broadcast operands between the plurality of VSPs, wherein the broadcast switch connects a storage device that is not dedicated to any of the plurality of VSPs with the plurality of VSPs; and
   a plurality of memory banks dedicated to respective VSPs of the plurality of VSPs, wherein a first memory bank dedicated to a first VSP of the plurality of VSPs comprises:
      a first plurality of high vector general purpose register (VGPR) banks; and
      a first plurality of low VGPR banks corresponding to the plurality of high VGPR banks,
      wherein the first plurality of high VGPR banks and the first plurality of low VGPR banks are configured to send operands to the first VSP without sending the operands through the broadcast switch, and
   wherein the first VSP is not configured to receive data from memory banks dedicated to other VSPs of the plurality of VSPs.

2. The processor of claim 1, further comprising a second memory bank dedicated to a second VSP of the plurality of VSPs, wherein the second memory bank comprises:
   a second plurality of high VGPR banks; and
   a second plurality of low VGPR banks corresponding to the second plurality of high VGPR banks.

3. The processor of claim 1, wherein the first memory bank further comprises a plurality of operand gathering components corresponding to VGPR banks of the first VSP, wherein a first operand gathering component is configured to store a first plurality of operands from a corresponding high VGPR bank and to store a second plurality of operands from a corresponding low VGPR bank.

4. The processor of claim 3, further comprising a phase multiplexer of the first VSP, wherein the phase multiplexer is configured to provide operands from the first operand gathering component to an arithmetic logic unit (ALU) of the first VSP.

5. The processor of claim 1, further comprising a scheduler configured to assign threads to individual VSPs of the plurality of VSPs.

6. The processor of claim 5, wherein dedicating a first thread to the first VSP comprises identifying a first high VGPR bank of the first VSP and a first low VGPR bank of the first VSP to store data of the first thread.

7. The processor of claim 6, wherein identifying the first high VGPR bank is based on at least a portion of an address of the first thread.

8. A processor, comprising:
   a plurality of vector sub-processors (VSPs);
   a broadcast switch configured to broadcast operands between the plurality of VSPs, wherein the broadcast switch connects a storage device that is not dedicated to any of the plurality of VSPs with the plurality of VSPs; and
   a plurality of memory banks dedicated to respective VSPs of the plurality of VSPs, wherein a first memory bank dedicated to a first VSP of the plurality of VSPs comprises:
      a plurality of operand gathering components configured to be assigned to individual threads and to store operands for the individual threads while the individual threads are assigned to the first VSP, wherein the plurality of operand gathering components are configured to send operands to the first VSP, and wherein the first VSP is not configured to receive operands from operand gathering components dedicated to another VSP of the plurality of VSPs.

9. The processor of claim 8, wherein a first operand gathering component of the plurality of operand gathering components comprises a first storage component configured to store a first operand from a high vector general purpose register (VGPR) bank of the first memory bank and a second operand from a low VGPR bank of the first memory bank.

10. The processor of claim 9, wherein the first operand gathering component is configured to receive the first operand and the second operand concurrently.

11. The processor of claim 9, wherein the first operand gathering component is configured to provide the first operand and the second operand to a phase multiplexer of the first VSP.

12. The processor of claim 11, wherein the phase multiplexer of the first VSP is configured to provide the first operand and the second operand to an arithmetic logic unit (ALU) of the first VSP.

13. The processor of claim 8, wherein the first VSP is configured to send a matrix multiplication input via the broadcast switch.

14. A method, comprising:
   receiving, by a scheduler of a processor, an address of a first thread;
   assigning, by the scheduler, the first thread to a first vector sub-processor (VSP) of a plurality of VSPs of the processor; and
   sending, by the scheduler via a broadcast switch that connects a storage device that is not dedicated to any of the plurality of VSPs with the plurality of VSPs, the first thread to a first high vector general purpose register (VGPR) bank and a first low VGPR bank, wherein the first high VGPR bank and the first low VGPR bank are dedicated to the first VSP, wherein the first high VGPR bank and the first low VGPR bank are configured to send operands to the first VSP without sending the operands through the broadcast switch.

15. The method of claim 14, further comprising:
   receiving, by the scheduler of the processor, an address of a second thread;
   assigning, by the scheduler, the second thread to a second VSP of the plurality of VSPs; and
   sending, by the scheduler, the second thread to a second high VGPR bank and a second low VGPR bank, wherein the second high VGPR bank and the second low VGPR bank are dedicated to the second VSP.

16. The method of claim 14, further comprising storing, by a first operand gathering component dedicated to the first VSP, a first plurality of operands for the first thread from the first high VGPR bank and a second plurality of operands for the first thread from the first low VGPR bank.

17. The method of claim 16, further comprising selectively sending, by a phase multiplexer of the first VSP, operands from a plurality of operand gathering components dedicated to the first VSP including the first operand gathering component to an arithmetic logic unit (ALU) of the first VSP.

18. The method of claim 17, further comprising sending, by the first VSP to the broadcast switch, double-precision thread data based on the ALU operating on the operands from the phase multiplexer, wherein the first plurality of operands are sent from the first high VGPR bank to the ALU of the VSP without being sent to the broadcast switch.

* * * * *